ꞏUnited States Patent [19]
Miller et al.

[11] 3,972,105
[45] Aug. 3, 1976

[54] SEAM GRIPPING DEVICE
[75] Inventors: Benton S. Miller, Bastrop, La.;
 William Douglas Lee, Simpsonville;
 Ralph Ligon King, Jr., Fountain Inn, both of S.C.
[73] Assignee: Mount Vernon Dryer Felt Co., Greenville, S.C.
[22] Filed: Mar. 3, 1975
[21] Appl. No.: 554,730

[52] U.S. Cl. .................................. 29/283; 24/87 R; 254/52
[51] Int. Cl.² ...................... B23Q 3/154; F16G 3/00
[58] Field of Search ....................... 29/283, DIG. 42; 24/31 B, 31 R, 31 H, 31 F, 87 R, 87 C; 74/231 J; 254/52–57, 62

[56] References Cited
UNITED STATES PATENTS
| | | | |
|---|---|---|---|
| 3,049,774 | 8/1962 | Rhodes | 24/87 R |
| 3,300,181 | 1/1967 | Spann | 254/52 |
| 3,574,898 | 4/1971 | Scott | 254/52 X |
| 3,599,936 | 8/1971 | Crain | 254/62 |

*Primary Examiner*—Al Lawrence Smith
*Assistant Examiner*—Gary L. Smith
*Attorney, Agent, or Firm*—Bailey & Dority

[57] ABSTRACT

A gripping device is provided for use in uniting the opposed ends of an endless dryer felt and the like at a hinged seam thereof so that a connecting rod may be inserted through the hinged seam. The gripping device includes a pair of spaced blocks with sharp pins extending downwardly therefrom for engaging the opposed ends of the dryer felt. The blocks are coupled together by a spring which tensions the opposed ends of the dryer felt together and holds the ends secured while the connecting rod is inserted through the hinge.

4 Claims, 3 Drawing Figures

U.S. Patent  Aug. 3, 1976  3,972,105
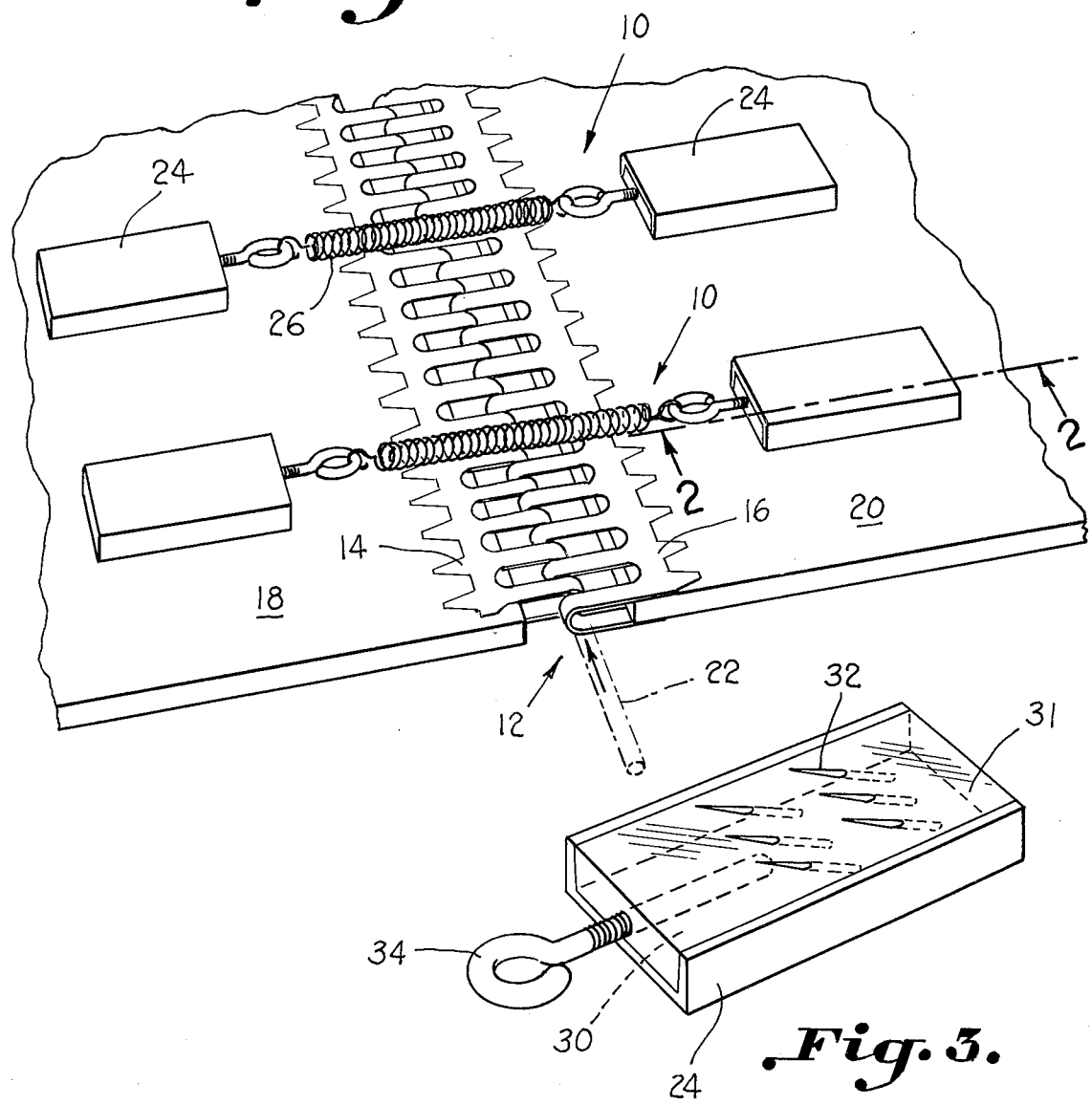
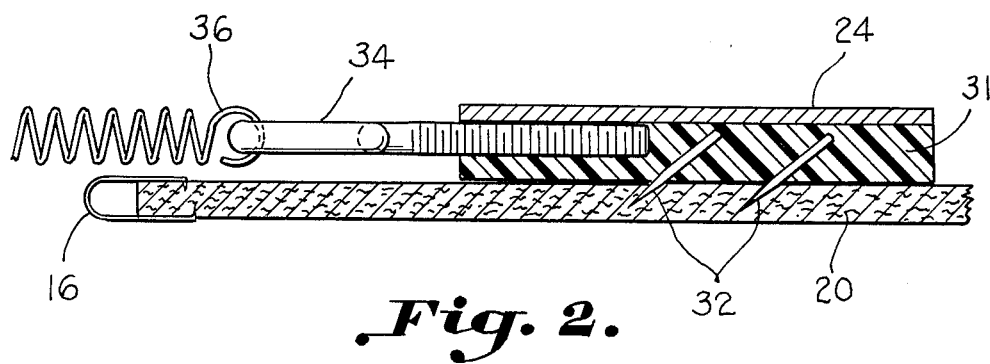

SEAM GRIPPING DEVICE

BACKGROUND OF THE INVENTION

The invention relates to a device for gripping the opposed ends of an endless traveling belt such as a dryer felt at a hinged seam thereof holding together the opposed ends so that a connecting rod may be inserted through the hinge.

Normally, the dryer felts are extremely wide, such as thirty feet, and travel over guide rollers in paper-making machinery or the like. The endless dryer felts are formed by providing a hinged seam which transverses the entire width of the felt. The conventional hinged seam includes a number of side-by-side wire loops extending from the two ends to be joined, with the loops on one end staggered and interleaved with respect to those on the opposed end. A connecting rod is inserted through the interleaved loops, across the entire width of the felt, to form the hinge pivot. The opposed ends of the dryer felt must be joined together by inserting the connecting rod through the hinge while the felts are on the guide rollers of the machine and often while the rollers are hot.

In addition, the wire loops which rotate about the connecting rod cause severe surface abrasion both of the rod and of the wire loops themselves. This seriously decreases the useful life of the hinged seam and precipitates the danger of failure during operation. Such a failure could cause collapse of the dryer felt into the paper machine basement with possible damage to other dryer felts on the same machine during the fall. Accordingly, to alleviate the problem of the relatively short life of the hinged seam, it is desirable to inspect and replace the connecting rod frequently. This presents a burdensome problem in that the opposed ends of the felt must be held in place expediently while the connecting rod is inserted in place.

Devices have been developed for drawing seam edges together such as in U.S. Pat. No. 3,300,181. However, such devices are for use in repairing carpet seams and employ a rather sophisticated lever mechanism which would be rather cumbersome and impractical to use on dryer felt seams. Another problem with such devices is that they would not operate on a curved surface such as when a seam is located over a roller.

SUMMARY OF THE INVENTION

The invention is for a gripping device for bridging the hinged seam of an endless dryer felt and the like uniting the opposed ends thereof so that a connecting rod may be inserted through the hinged seam. The gripper device includes a pair of spaced-apart longitudinal blocks having sharpened pins carried in the bottom thereof for engaging the dryer felt. Coupling the blocks together is a spring or any other suitable resilient tensioning means. When the blocks are placed across the hinged seam of the endless dryer felt, the spring stretches and the pins engage the opposed ends of the felt tensioning or pulling them together. In this manner the opposed ends can be held securely together while a connecting rod is inserted through the hinge.

Accordingly, an important object of the present invention is to provide a seam gripping device for bridging the hinged seam and holding the opposed ends of an endless belt in place while a connecting rod is inserted through the hinged seam thereof.

Another important object of the present invention is to provide a seam gripping device for holding the opposed ends of an endless belt in place which is of simple and inexpensive construction so that it may be manufactured in large quantities to permit a plurality of said devices to be used in bridging the seams of extremely wide endless belts.

Still another important object of the present invention is to provide a seam gripping device bridging the hinged seam of an endless belt which can easily and quickly be installed and removed.

Still another important object of the present invention is to provide a seam gripping device which can be used to grip seams which lie over curved surfaces as well as flat surfaces.

BRIEF DESCRIPTION OF THE DRAWING

The construction designed to carry out the invention will be hereinafter described, together with other features thereof.

The invention will be more readily understood from a reading of the following specification and by reference to the accompanying drawing forming a part thereof, wherein an example of the invention is shown and wherein:

FIG. 1 is a perspective view illustrating the opposed ends of an endless traveling belt united together with seam gripping devices constructed in accordance with the present invention, FIG. 2 is a bottom perspective view illustrating a seam gripping device constructed in accordance with the present invention, and FIG. 3 is a detailed cross-section elevational view taken on the line 2—2 of FIG. 1.

DESCRIPTION OF THE PREFERRED EMBODIMENT

The drawing illustrates a seam gripping device for bridging a hinged seam of an endless traveling belt such as a dryer felt for gripping and uniting the opposed ends thereof so that the hinged ends may be joined by inserting a connecting rod therethrough.

Referring in more detail to FIG. 1 of the drawing, there is illustrated a plurality of gripping devices, each generally designated as 10 which are placed across a hinged seam shown generally at 12. The hinged seam 12 includes a series of side-by-side wire loops 14 and 16 extending from the two ends or edges 18 and 20, respectively, to be joined. The loops 14 are staggered and interleaved with respect to the loops 16. A connecting rod 22 passes through the interleaved loops 14 and 16 across the entire width of the belt, to form the hinge pivot. Each gripping device 10 includes a pair of longitudinal block members 24 with a suitable resilient tensioning member such as spring 26 coupled therebetween.

The detail of an individual block member 24 is best shown in FIGS. 2 and 3 and includes a hollow bottom portion 30 which is filled with an epoxy resin, polyurethane or other suitable cement material 31. Block member 24 may be machined out or molded of aluminum or any other suitable material. Set within the hardened epoxy 31 is a plurality of sharpened pins 32 for engaging the fabric of the belt edge 20. Pins 32 are set at an angle of inclination so that when the gripping device 10 is placed in tension across the seam 12, the set of pins in one block member 24 are inclined with respect to the set of pins in the opposed block member.

An eye bolt 34 or other suitable coupling means is set within the epoxy 31 for receiving the hooked end 36 of spring 26.

The individual block member 24 shown in FIGS. 2 and 3 may be made also from solid metal blocks with pins 32 pressed into holes drilled therein eliminating the use of epoxy or other suitable cement materials.

In use, when the connecting rod 22 is worn or otherwise needs replacing, the gripping device 10 is stretched across the hinged seam engaging the opposed belt ends 18 and 20 in such a manner so as to unite the ends together for temporarily holding the loops 14 and 16 in an interleaved relationship so that the old rod may be withdrawn and a new one inserted. In the event that the seam of the belt is located across the curved surface of a roller about which it travels at the instant replacement is desired, the gripping device of the present invention affords the particular advantage that the spring 26 or other suitable resilient tensioning means has flexibility in the vertical and lateral direction as well as the longitudinal direction permits the device to be tensioned or stretched around the curved surface, thus the gripping device of the present invention is not limited to use on planar surfaces.

While a preferred embodiment of the invention has been described using specific terms, such description is for illustrative purposes only, and it is to be understood that changes and variations may be made without departing from the spirit or scope of the following claims.

We claim:

1. A seam gripping device for temporarily holding the ends of a belt together while a connecting member is installed at a seam thereof for uniting the ends together in a more permanent manner as said belt is carried about rollers, said gripping device comprising:
   a. a pair of block members spaced apart bridging said seam with a block member spaced on each side of said seam;
   b. said block members having a bottom portion with sharpened pins carried therein for engaging said belt;
   c. said pins carried in each of said block members inclined with respect to the pins carried in the other of said block members; and
   d. resilient tensioning means coupled between said longitudinal block members resiliently urging said block members towards each other for pulling said ends of said belt together, said resilient tensioning means having flexibility in a longitudinal and vertical direction enabling said block members to be positioned around a curved surface and over said seam when said seam is located over a curved surface of said rollers;
   whereby said gripping device effectively holds said belt ends secured while said connecting member is installed to form said belt seam.

2. The device of claim 1 wherein the bottom portions of said blocks have formed therein a hollow portion which receives a cementing material for setting and holding said sharpened pins in place.

3. The device of claim 1 wherein said resilient tensioning means includes a spring.

4. The device of claim 1 wherein said block members have a plurality of holes formed in a bottom surface, said pins being pressed fitted in said holes.

* * * * *